US010107664B2

(12) United States Patent
Chen et al.

(10) Patent No.: US 10,107,664 B2
(45) Date of Patent: Oct. 23, 2018

(54) MEASUREMENT TOOL FOR A CIRCLE AREA

(71) Applicant: National Taiwan Normal University, Taipei (TW)

(72) Inventors: Jung-Hsuan Chen, Taipei (TW); Chin-Guo Kuo, Taipei (TW); Chao-Fu Shu, Taipei (TW)

(73) Assignee: NATIONAL TAIWAN NORMAL UNIVERSITY, Taipei (TW)

( * ) Notice: Subject to any disclaimer, the term of this patent is extended or adjusted under 35 U.S.C. 154(b) by 124 days.

(21) Appl. No.: 15/449,379

(22) Filed: Mar. 3, 2017

(65) Prior Publication Data

US 2018/0172497 A1     Jun. 21, 2018

(30) Foreign Application Priority Data

Dec. 20, 2016   (TW) .............................. 105142193 A

(51) Int. Cl.
*G01F 17/00*   (2006.01)
*G09B 23/04*   (2006.01)
(52) U.S. Cl.
CPC ............. *G01F 17/00* (2013.01); *G09B 23/04* (2013.01)

(58) Field of Classification Search
None
See application file for complete search history.

(56) References Cited

U.S. PATENT DOCUMENTS

| | | | |
|---|---|---|---|
| 2006/0008381 A1* | 1/2006 | Taguchi | B01L 3/5027 422/400 |
| 2006/0032067 A1* | 2/2006 | Orr | G01B 3/34 33/501.08 |
| 2016/0318145 A1* | 11/2016 | Kawanishi | G01B 11/08 |

* cited by examiner

*Primary Examiner* — Andre Allen
(74) *Attorney, Agent, or Firm* — Muncy, Geissler, Olds & Lowe, P.C.

(57) ABSTRACT

A measurement tool for circle area includes a cylinder, a rectangular container and a pipe. The cylinder is provided with a first opening and filled with a liquid. The rectangular container is provided with a second opening, and at least side surface of the rectangular container is provided with at least scale table. The pipe is arranged on the cylinder and the rectangular container and connected with the first opening and the second opening. When the cylinder is tilted, the liquid flows to the rectangular container through the pipe, and a volume of the liquid in the rectangular container is figured out according to a length, a width and a height of the rectangular container and the scale table. The volume equals an inner-cylinder volume of the cylinder. An inner-circle area of the cylinder is obtained according to the inner-cylinder volume and a height of the cylinder.

9 Claims, 4 Drawing Sheets

MEASUREMENT TOOL FOR A CIRCLE AREA

This application claims priority for Taiwan patent application no. 105142193 filed on Dec. 20, 2016, the content of which is incorporated in its entirely.

BACKGROUND OF THE INVENTION

Field of the Invention

The present invention relates to a teaching tool, particularly to a measurement tool for circle area.

Description of the Related Art

Science is based on mathematics. Mathematics is divided into geometry and algebra. Geometry involves with calculations for various areas and volumes. However, it is difficult for students to understand how an equation is established only by numerals. Although a picture can be drawn or established in one's mind, no teaching tools interest students. As a result, they cannot enjoy mathematics, even fears and hates it.

Presently, an approximate value $\pi r^2$ of a circle area is estimated by the circle area and either of a circumscribed square area or an inscribed square area thereof. However, it is very inconvenient for beginning learners to understand the estimation method. Apparently, learning interests and application logic are seriously affected.

To overcome the abovementioned problems, the present invention provides a measurement tool for circle area, so as to solve the afore-mentioned problems of the prior art.

SUMMARY OF THE INVENTION

A primary objective of the present invention is to provide a measurement tool for circle area, which pours water filling a cylinder into a rectangular container, calculates a volume of the water in the rectangular container and uses the volume and a height of the cylinder to calculate a circle area.

Another objective of the present invention is to provide a measurement tool for circle area, which calculates a circle area by a volume of a rectangular container, whereby abstract numeral calculation becomes more comprehensible.

To achieve the abovementioned objectives, the present invention provides an measurement tool for circle area, which comprises a cylinder, a rectangular container and a pipe. The cylinder is provided with a first opening and filled with a liquid. The rectangular container is provided with a second opening, and at least side surface of the rectangular container is provided with at least scale table. The pipe is arranged on the cylinder and the rectangular container and connected with the first opening and the second opening. When the cylinder is tilted, the liquid flows to the rectangular container through the pipe, and a volume of the liquid in the rectangular container is figured out according to a length, a width and a height of the rectangular container and the scale table. The volume equals an inner-cylinder volume of the cylinder. An inner-circle area of the cylinder is obtained according to the inner-cylinder volume and a height of the cylinder.

In the present invention, a side of the rectangular container is connected with the cylinder.

The width of the rectangular container equals an inner-circle radius of the cylinder. The height of the rectangular container equals a height of the cylinder. The length of the rectangular container is equal to or larger than an inner-periphery length of the cylinder.

The scale table further comprises a first scale table arranged on a first side surface formed by two length edges and two width edges of the rectangular container.

The first scale table is arranged on a center of the first side surface, and the first scale table has a plurality of first scales parallel to a direction of the length.

The scale table further comprises a second scale table arranged on a second side surface formed by two length edges and two height edges of the rectangular container.

The second scale table is arranged on a center of the second side surface, and the second scale table has a plurality of second scales parallel to a direction of the height.

Below, the embodiments are described in detail in cooperation with the drawings to make easily understood the technical contents, characteristics and accomplishments of the present invention.

DETAILED DESCRIPTION OF THE INVENTION

The present invention provides a measurement tool for circle area used as a teaching tool, which not only calculate a value of a circle area but also utilizes a rectangular container to understand a calculation principle of circle area.

Figure 1:
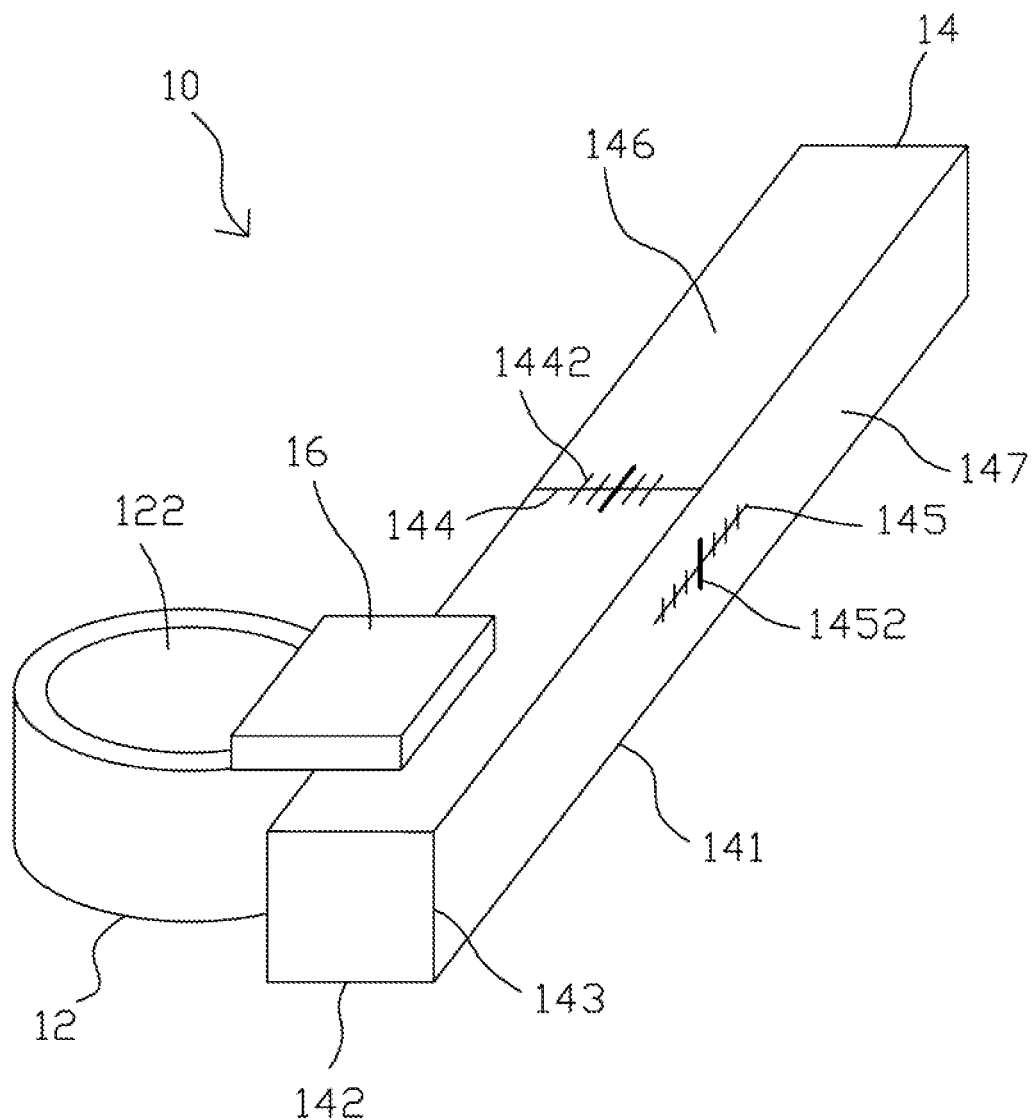
FIG. 1 is a perspective view of a measurement tool for circle area according to an embodiment of the present invention.

Refer to FIG. 1. FIG. 1 is a perspective view of a measurement tool 10 for circle area according to an embodiment of the present invention. The measurement tool 10 comprises a cylinder 12, a rectangular container 14 and a pipe 16. The cylinder 12 is provided with a first opening 122 and filled with a liquid. The rectangular container 14 is provided with a second opening (not shown). At least side surface of the rectangular container 14 is provided with at least scale table. A first side surface 146 of the rectangular container 14 is provided with a first scale table 144 having a plurality of first scales 1442. The first scale table 144 is arranged on a center of the first side surface 146. The plurality of first scales 1442 is parallel to a direction of a length edge 141 of the rectangular container 14. A second side surface 147 of the rectangular container 14 is provided with a second scale table 145 having a plurality of first scales 1452. The second scale table 145 is arranged on a center of the second side surface 147. The plurality of second scales 1452 is parallel to a direction of a height edge 143 of the rectangular container 14. The pipe 16 is arranged on the cylinder 12 and the rectangular container 14 and connected with the first opening 122 and the second opening.

In the present invention, the length of the length edge 141 of the rectangular container 14 is equal to or larger than an inner-periphery length of the cylinder 12. The length of a width edge 142 of the rectangular container 14 equals an inner-circle radius of the cylinder 12. The length of the height edge 143 of the rectangular container 14 equals a height of the cylinder 12. If an inner-circle diameter and an inner height of the cylinder 12 are respectively 2r and h, an inner-circle area and an inner-cylinder volume of the cylinder 12 are respectively $\pi r^2$ and $\pi r^2 \times h$. If the rectangular container 14 has a width r, a height h and a length $2\pi r$, the rectangular container 14 has a volume of $r \times h \times 2\pi r$.

The first side surface 146 is formed by two length edges 141 and two width edges 142 of the rectangular container 14. The second side surface 147 is formed by two length edges and two height edges of the rectangular container 14. The scale table 144 is arranged at a midpoint ($\pi r$) of the length of the rectangular container 14. The middle scale of the first scale table 144 is r/2. The second scale table 145 is arranged in the rectangular container 14. The middle scale of the second scale table 145 aims at a half position of the length edge 141, namely $\pi r$.

Figure 2:
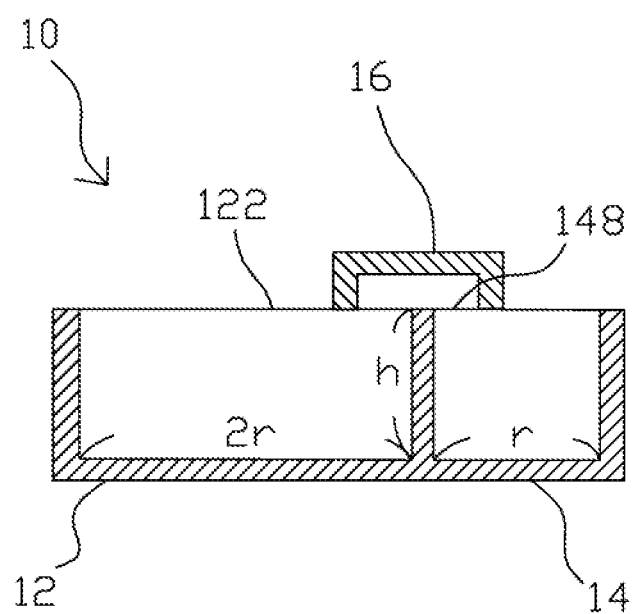
FIG. 2 is a sectional view of the measurement tool for circle area according to an embodiment of the present invention.

Refer to FIG. 2. FIG. 2 is a sectional view of the measurement tool for circle area according to an embodiment of the present invention. FIG. 2 shows the cylinder 12 in communication with the rectangular container 14. The pipe 16 is arranged on the cylinder 12 and the rectangular container 14. A top of the rectangular container 14 is provided with a second opening 148 whereby the liquid in the cylinder 12 flows from the first opening 122 to the second opening 148 through the bottom cavity of the pipe 16. Thus, the liquid is poured into the rectangular container 14. Since the inner-circle diameter of the cylinder 12 is 2r and the width of the rectangular 14 is r, the inner-circle radius of the cylinder 12 equals the width of the rectangular container 14. Besides, the height h of the rectangular container 14 equals that of the cylinder 12.

In the present invention, when the cylinder 12 is tilted, the liquid filling the cylinder 12 flows to the rectangular container 14 through the pipe 16. A volume of the liquid in the rectangular container 14 is figured out according to the length, the width and the height of the rectangular container 14 and the scale tables, and the volume equals the inner-cylinder volume of the cylinder 12, an inner-circle area of the cylinder 12 is obtained according to the inner-cylinder volume and a height of the cylinder 12.

Figure 3:
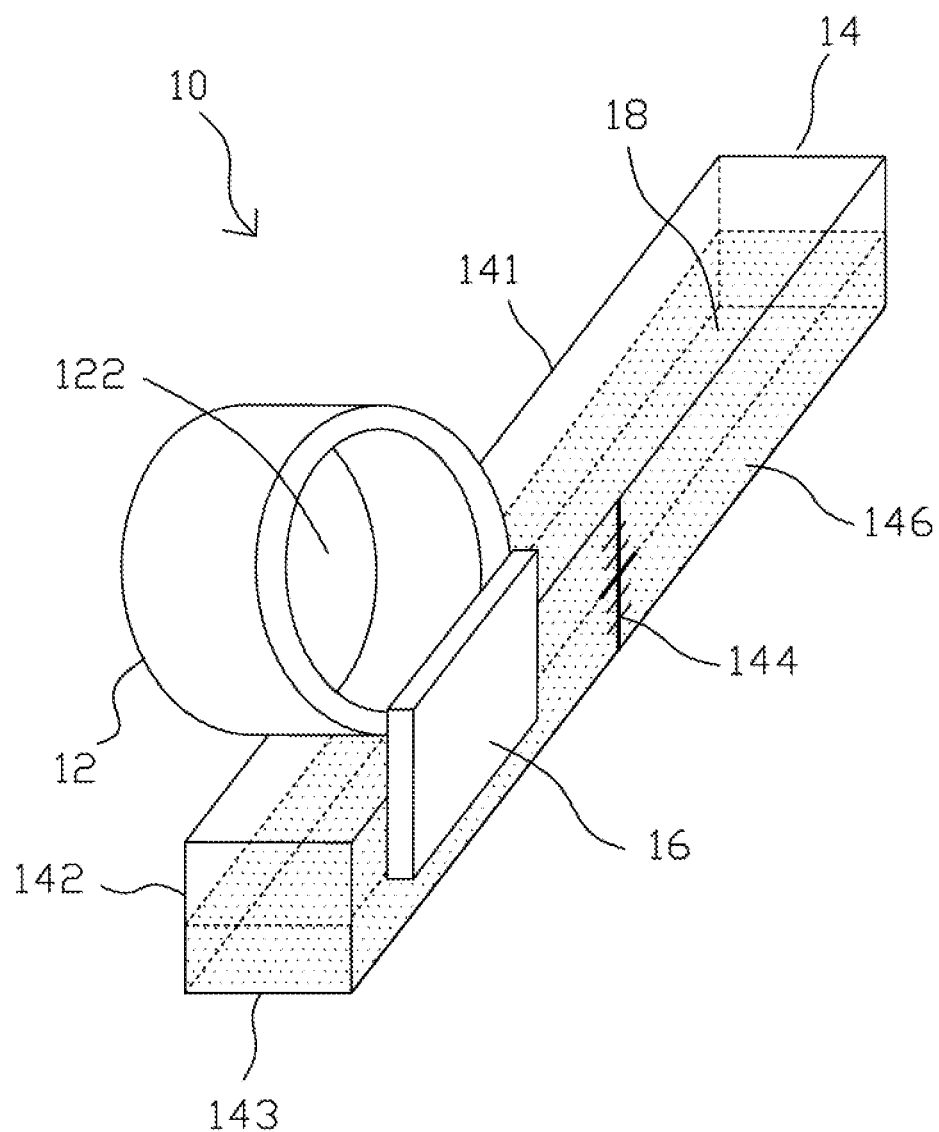
FIG. 3 is a perspective view of using the measurement tool for circle area according to an embodiment of the present invention.

Although the length of the length edge 141 of the rectangular container 14 is adaptable, the length of the length edge 141 of the rectangular container is equal to or larger than an inner-periphery length of the cylinder 12, whereby a volume of the rectangular container 14 is larger than or equal to that of the cylinder 12. The embodiment, which exemplifies the fact that the length of the length edge 141 of the rectangular container 14 is larger than an inner-periphery length of the cylinder 12, is introduced as below:

FIG. 3 is a diagram schematically showing the liquid filling the cylinder 12 poured into the rectangular container 14 according to an embodiment of the present invention. FIG. 3 shows the measurement tool 10 for circle area of FIG. 1 turned over to the right through 90 degrees. Thus, the second side surface 147 of FIG. 1 becomes a bottom surface of FIG. 3. When water fills the cylinder 12, a volume of the water equals the inner-cylinder volume of the cylinder 12. The liquid 18 then flows to the rectangular container 14 through the pipe 16, as shown in FIG. 3. At this time, a bottom area of the liquid 18 in the rectangular container 14 equals the length of the rectangular container 14 multiplied by the height of the rectangular container 14, namely $2\pi rh$. From the first scale table 144, the height of water aims at a half position of the width edge 142, namely r/2. As a result, a volume of the liquid 18 in the rectangular container 14 is $h \times (r/2) \times 2\pi r = \pi r^2 \times h$. Accordingly, the inner-cylinder volume of the cylinder 12 is also $\pi r^2 \times h$. Then, $\pi r^2 \times h$ divided by the inner height h of the cylinder 12 equals the inner-circle area $\pi r^2$ of the cylinder 12.

Figure 4:
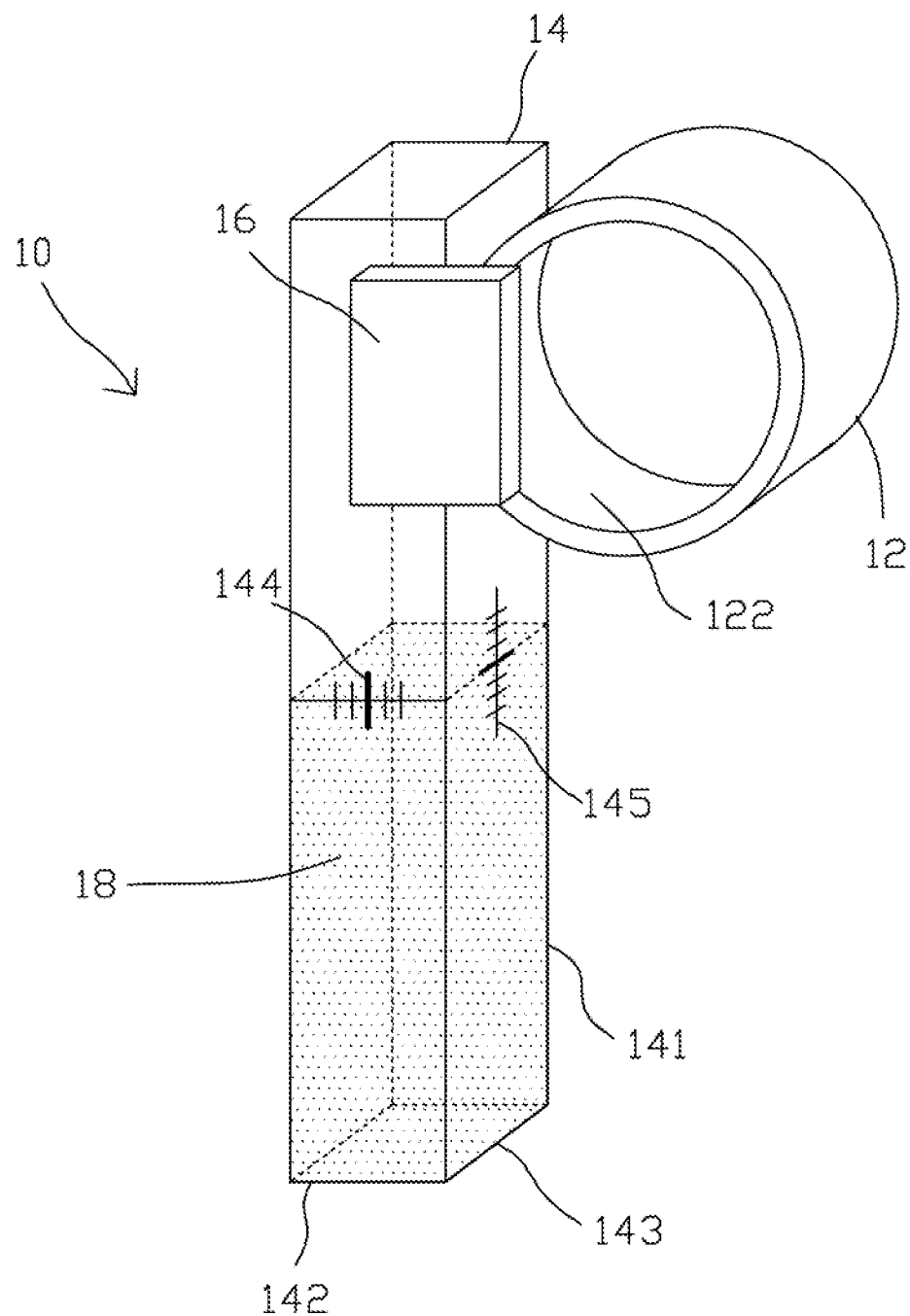
FIG. 4 is a perspective view of using the measurement tool for circle area according to another embodiment of the present invention.

FIG. 4 is a diagram schematically showing another embodiment of the present invention, wherein the rectangular container 14 is upright. After the liquid flows to the rectangular container 14, the liquid does not overflow due to the fact that the first opening 122 and the second opening (not shown) are arranged at upper position. When the liquid 18 is poured into the rectangular container 14, the measurement tool 10 for circle area is turned over, as shown in FIG. 3. After the liquid 18 completely flows to the rectangular container 14, the rectangular container 14 is uprighted so that the cylinder 12 is arranged at an upper position. In FIG. 4, the lengths of the length edge 141, the width edge 142 and the height edge 143 of the rectangular container 14 are respectively $2\pi r$, r and h. Thus, a bottom area of the liquid 18 in the rectangular container 14 equals the width of the rectangular container 14 multiplied by the height of the rectangular container 14, namely $r \times h$. From the second scale table 145, the height of water aims at a half position of the length edge 141, namely $2\pi r/2 = \pi r$. As a result, a volume of the liquid 18 in the rectangular container 14 is $r \times h \times \pi r = \pi r^2 \times h$. Accordingly, the inner-cylinder volume of the cylinder 12 is also $\pi r^2 \times h$. Then, $\pi r^2 \times h$ divided by the inner height h of the cylinder 12 equals the inner-circle area $\pi r^2$ of the cylinder 12.

In conclusion, the present invention provides a measurement tool for circle area, which connects the cylinder with the rectangular container, uses a pipe to guide the liquid filling the cylinder to the rectangular container and multiplies a cross-section area of the rectangular container by the height of water in the rectangular container to obtain a volume of the liquid. The volume of the liquid equals the inner-cylinder volume of the cylinder. The volume of the liquid divided by the inner height of the cylinder equals the circle area. As a result, the present invention makes the calculation method for circle area simpler and uses the circle area, the cylinder volume and the rectangular volume to make beginning learners understand geometric relations intuitively and easily.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A measurement tool for circle area comprising:
    a cylinder provided with a first opening and filled with a liquid;
    a rectangular container provided with a second opening, and at least side surface of said rectangular container is provided with at least scale table; and
    a pipe arranged on said cylinder and said rectangular container and connected with said first opening and said second opening, and when said cylinder is tilted, said liquid flows to said rectangular container through said pipe, and a volume of said liquid in said rectangular container is figured out according to a length, a width and a height of said rectangular container and said scale table, and said volume equals an inner-cylinder volume of said cylinder, an inner-circle area of said cylinder is obtained according to said inner-cylinder volume and a height of said cylinder.

2. The measurement tool for circle area according to claim 1, wherein a side of said rectangular container is connected with said cylinder.

3. The measurement tool for circle area according to claim 1, wherein said width of said rectangular container equals an inner-circle radius of said cylinder.

4. The measurement tool for circle area according to claim 1, wherein said height of said rectangular container equals a height of said cylinder.

5. The measurement tool for circle area according to claim 1, wherein said length of said rectangular container is equal to or larger than an inner-periphery length of said cylinder.

6. The measurement tool for circle area according to claim 1, wherein said at least scale table further comprises a first scale table arranged on a first side surface formed by two length edges and two width edges of said rectangular container.

7. The measurement tool for circle area according to claim 1, wherein said at least scale table further comprises a second scale table arranged on a second side surface formed by two length edges and two height edges of said rectangular container.

8. The measurement tool for circle area according to claim 6, wherein said first scale table is arranged on a center of said first side surface, and said first scale table has a plurality of first scales parallel to a direction of said length.

9. The measurement tool for circle area according to claim 7, wherein said second scale table is arranged on a center of said second side surface, and said second scale table has a plurality of second scales parallel to a direction of said height.

* * * * *